Dec. 18, 1923.  
F. M. HILL  
MEANS FOR BRINE CIRCULATION  
Filed Aug. 13, 1921  
1,478,120

Frank M. Hill.  
INVENTOR  
BY Victor J. Evans  
ATTORNEY

Patented Dec. 18, 1923.

1,478,120

UNITED STATES PATENT OFFICE.

FRANK M. HILL, OF CAMDEN, NEW JERSEY.

MEANS FOR BRINE CIRCULATION.

Application filed August 13, 1921. Serial No. 491,983.

*To all whom it may concern:*

Be it known that I, FRANK M. HILL, a citizen of the United States, residing at Camden, in the county of Camden and State of New Jersey, have invented new and useful Improvements in Means for Brine Circulation, of which the following is a specification.

This invention relates to refrigerating apparatus or means for cooling receptacles or chambers for the storage of foods and the like by using a mixture of ice and salt or calcium chloride and it has for its primary object the provision of a novel method and means whereby a heretofore unattainable economy in brine wastage is effectively ensured whilst a correspondingly increased degree or capacity of refrigeration is ensured.

Another object of this invention is the provision of a novel means whereby the brine mixture is caused to circulate through a refrigerating receptacle or chamber and thereby effect better refrigeration as well as maintaining a more uniform degree of refrigeration.

A further object of this invention is a novel method and means whereby the brine is concentrated as desired and thereby materially increases the degree of local refrigeration by the radiation of cold energy.

Still further this invention has for an object the provision of a simple apparatus that can be readily installed in connection with existing refrigerators whereby their efficiency is greatly enhanced, with a correspondingly increased refrigerating capacity.

A still further object aimed at is the provision of a new or improved refrigerating means which is simple in construction, cheap to manufacture or install, effective in use, and not liable to get out of order under normal service conditions.

With the foregoing and other objects in view as will later on become more apparent as this description proceeds, my invention consists essentially in the novel method and means for effecting brine circulation and concentration hereinafter fully described and more specifically defined by the appended claims.

In the further disclosure of the invention reference is to be had to the accompanying sheet of explanatory drawings constituting a part of this specification, and in which like characters of reference designate the same or corresponding parts in both views.

Figure 1:
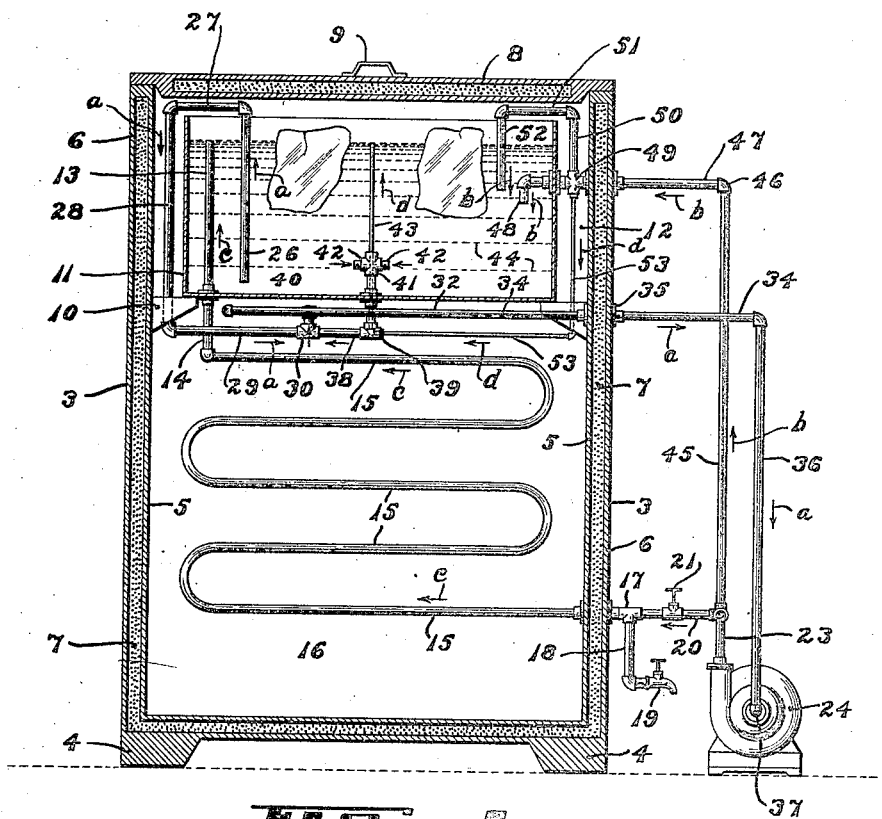
Figure 2:
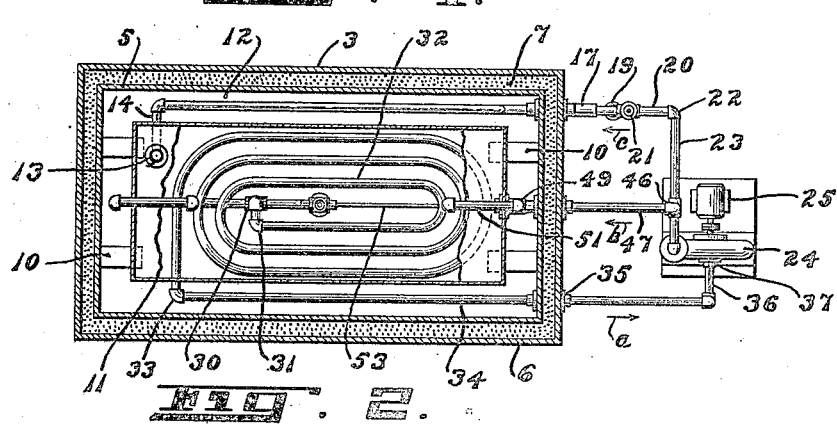

Figure 1 is a vertical section through a refrigerator or ice-box embodying one practical application of my invention; and, Figure 2 is a transverse section through the same with part of the brine tank bottom broken away or in section for a clearer understanding of the underlying structure.

Referring more particularly to the views the numeral 3 designates a refrigerating chamber or receptacle mounted on feet 4 and including inner and outer spaced walls 5, 6, respectively, between which is an appropriate insulation 7, a cover or lid 8 fitting thereon and being provided with a handle 9 whereby it may be removed and replaced as desired. Inside said chamber or receptacle 3 are a plurality or series of spaced brackets 10 on which is seated the brine tank 11 conveniently of appropriate dimensions to provide a surrounding clearance space 12 thereabout. Suitably supported or fitted within the brine tank 11 is the overflow or stand-pipe 13 connecting at its lower end by an elbowed branch pipe 14 with a zig-zag coil 15 disposed to one side or at the back of the storage chamber 16, and having its lower end extended outside said chamber 3 and connected into a T 17. From this T 17 there is a depending drain pipe 18 having an elbow at its bottom into which is fitted a faucet or drain cock 19, whereby provision is made for draining-off any of the gravity overflow as and whenever desired. Leading from the T 17 is a pipe 20 fitted with a shut-off cock or valve 21 and elbowed at 22 into a second pipe 23 connecting with a circulating pump 24 conveniently driven by a small electric motor 25. This pump 24 may be of any desired pattern and located as shown outside the refrigerator 3 or it may be mounted therein and have its shaft extended out through a stuffing box in the walls 5, 6, and coupled to the motor 25 in any suitable manner.

Extended downwardly into the brine tank 11 is one leg 26 of an inverted U-shaped pipe 27 the other leg 28 being connected by a pipe 29 into a T 30 from which an elbow 31 is coupled to a horizontally spaced coil 32 mounted in close juxtaposition and parallel relation beneath the bottom of said brine tank 11. Leading from the free end 33 of the coil 32 is a pipe 34 which passes out of the refrigerator 3 at 35 and is connected by a down pipe 36 to the suction end 37 of the circulating pump 24. Extending laterally from the aforesaid T 30 is a pipe 38 joined to a centrally positioned T 39 connecting into the bottom 40 of the brine tank 11 and from which rises a four-way coupling 41 the lateral branches 42 whereof constitute inlets at a level slightly above that of the aforementioned leg 26, and connected into the upper end of said four-way coupling by a reducing nipple or plug is a small diameter pipe 43 the upper open end whereof extends to the normal high level mark of the combined ice and salt mixture 44 in the tank 11. Branched upwards from the aforesaid pipe 23 is a pipe 45 elbowed at 46 into the refrigerator 3 by a connecting pipe 47 and having a turned-down end 48 at a mid or lower level mark of said mixture 44. A four-way coupler 49 is interposed in the pipe 47 exterior of the tank 11 and joined to the upper vertical branch thereof is one leg 50 of an inverted U-shaped pipe 51 the other leg 52 whereof extends down into said tank 11 to a point slightly above the open end of the pipe 48, and leading from the lower vertical branch of the four-way coupler 49 is a smaller diameter pipe 53 connected into the aforementioned T 39.

From the foregoing description and an examination of the drawings it will be apparent that by my present invention there is provided what may be termed a self contained and self-recharging refrigerating apparatus or ice-box for example when it is desired to circulate the denser brine mixture from the bottom of the tank 11 the shut-off cock or valve 21 is closed and the motor 25 set in operation which will cause a suction of the said heavier brine mixture in the direction of the arrows marked A to the circulating pump 24, and a discharge or circulation therefrom in the direction of the arrows marked B, which will result in a recharging of the less dense solution of brine at the top of the tank 11. Similarly this operation may be employed whenever fresh ice is supplied to or put in the tank 11 and thereby effecting a great economy. On the other hand it is to be particularly observed that the provision of the coil 32 in spaced relation beneath the bottom of the brine tank 11 makes provision whereby a quantity of the denser brine mixture may be concentrated therein and thus localize a considerable amount of cold energy beneath said tank 11 as well as at the top of the storage chamber 16, said concentrated cold energy when expended being readily replaced as will be clearly comprehended without further detailed description. Still further it is to be particularly noted that by opening the shut-off cock or valve 21 when the circulating pump 24 is in operation a part of the denser brine mixture may be switched in the direction of the arrows marked C through the zig-zag coil 15 which will result in a concentration therein of a volume of cold energy that will ensure the proper cooling and maintaining cool of the lower portion of the chamber 16 whereby a considerably increased refrigeration efficiency is attained. Still further it will be observed that when the circulating pump 24 is in operation a thorough distribution of the denser brine mixture takes place in that a portion thereof will circulate in the direction of the arrows marked D to the center part of the tank whereby a thorough recharging takes place. Obviously the over flow or weak brine mixture flowing down the pipe 13 may be drained off by opening the faucet or drain-cock 19 to waste or to a storage or settling tank, said settling tank in turn being coupled up to the circulating pump 24 for draining of and recirculating or reclaiming whatever brine may deposit therein, whereby a self contained or continuous service salt-saving or reclamation system is effectively ensured. A drip pan—not shown—will be provided in connection with the brine tank 11 to prevent moisture accumulating in the chamber 16. When desired it will be obvious that a thermostatic control may be associated with the system whereby the motor 25 may be automatically started whenever the temperature of the refrigerating chamber rises to a predetermined degree and similarly stopped when said temperature is reduced to the normal refrigerating or a lower degree.

A still further feature to be noted is the fact that any brine carried away by the overflow or stand-pipe 13 will tend to settle and concentrate in the zig-zag coil 15 thereby effectively ensuring an increased efficiency in the refrigerating chamber 16.

Whilst there has been shown and described one practical embodiment or application of my present invention the same is not to be construed as conclusive, as it will be obvious the same is susceptible of considerable change and variation without in any way departing from the essential features, and the right is hereby reserved to make such changes in detail arrangement or other combinations of the several parts as fairly lie within the scope of the appended claims.

Having described my invention, what I claim as new and desire to secure by Letters Patent is:

1. In a device of the class described, a refrigerating chamber, a tank therein for containing a brine solution, a pump, a coil within the chamber, connections for passing brine from the tank through the coil, secondly through the pump and thence to the tank, a second coil within the chamber, and connections for passing brine from the pump directly to and through the second coil and thence into the tank.

2. In a device of the class described, a refrigerating chamber, a tank therein for containing a brine solution, a pump, a coil within the chamber, connections for passing brine from the tank through the coil, secondly through the pump and thence to the tank, a second coil within the chamber, connections for passing brine from the pump directly to and through the second coil and thence to the tank pipes through which brine may be drawn from the tank by the pump at a level below the level of the discharge from the coil to the tank, and a pipe communicating with said connections between the pump and second coil, this pipe extending into the tank at a point remote from the points where brine is withdrawn therefrom, and at a different level.

In testimony whereof I affix my signature.

FRANK M. HILL.